United States Patent [19] [11] 4,336,969
Kahlert et al. [45] Jun. 29, 1982

[54] JOURNAL BEARING

[75] Inventors: Peter Kahlert, Radebeul; Norbert Dittmann; Heiner Fink, both of Dresden; Frank Junker, Radebeul; Günter Lehmann, Coswig; Horst Schulz, Dresden; Hans Johne, Radebeul; Arndt Jentzsch, Coswig; Werner Kühnert, Radebeul, all of German Democratic Rep.

[73] Assignee: VEB Kombinat Polygraph "Werner Lamberz", Leipzig, Leipzig, German Democratic Rep.

[21] Appl. No.: 155,482

[22] Filed: Jun. 2, 1980

[30] Foreign Application Priority Data

May 14, 1979 [DD] German Democratic Rep. ... 212839

[51] Int. Cl.$^{3}$ .............................................. F16C 35/02

[52] U.S. Cl. ........................................ 308/61; 308/31; 308/244

[58] Field of Search ..................... 308/61, 72, 244, 29, 308/31, 32, 37, 237 R, 237 A, 59, 60, 16, 17, 58

[56] References Cited

U.S. PATENT DOCUMENTS 2,772,596 12/1956 Trussell .............................. 308/244
3,139,311 6/1964 Melton et al. ......................... 308/37

*Primary Examiner*—Lenard A. Footland
*Attorney, Agent, or Firm*—Michael J. Striker

[57] ABSTRACT

A journal bearing of printing machines for permitting compensation for misalignments between a trunnion and a sliding bushing by means of a flanged bearing sleeve. The flanged bearing sleeve is provided with a plurality of grooves each being in engagement with a wedge which is movable therein, thereby achieving a compensation for misalignments.

8 Claims, 2 Drawing Figures

JOURNAL BEARING

BACKGROUND OF THE INVENTION

This invention relates to a journal bearing, and more particularly to journal bearings of printing machines.

From the German published application DE-OS No. 2 138 956 journal bearings are known in which shafts or trunnions are supported in bushings threadedly mounted in a bore of a machine frame.

This arrangement, however, has the disadvantage that a compensation for misalignments of bores is not possible, since on the one hand the position of the bearings is predetermined by their fixation to the frame or by the centering of the bearings in the frame, and on the other hand an alignment relative to the trunnions is not provided.

Thus, possible misalignments must be compensated by a sufficient play between the trunnions and the bushing. This, however, can result in impairment of the operations of the printing machine when the play is too large.

SUMMARY OF THE INVENTION

Accordingly, it is an object of the invention to overcome the difficulties of the prior art.

More particularly, it is an object of the invention to provide a journal bearing which permits a compensation for misalignment of the bushing relative to the trunnion so that any impairments are prevented.

Yet another object of the invention is to provide a journal bearing which permits a bearing alignment without causing any inclination of the trunnion within the bushing.

In keeping with these objects, and with others which will become apparent hereafter, one feature of the invention resides, briefly stated, in a journal bearing for supporting a shaft in a bore of a frame comprising a flanged bearing sleeve means for adjusting the flanged bearing sleeve relative to the frame, and means for moving the flanged bearing sleeve relative to the frame to compensate for misalignment of the bore.

According to another feature of the invention, the flanged bearing sleeve is provided with a plurality of grooves which are uniformly spaced around its periphery and are in engagement with respective wedges. Each wedge is provided with an oblong hole and is movable normal to the axis of the trunnion so that a compensation for misalignment of the frame bore is easily carried out by sliding one or several of these wedges.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with accompanying drawings.

DESCRIPTION OF THE PREFERRED EMBODIMENT

Figure 1:
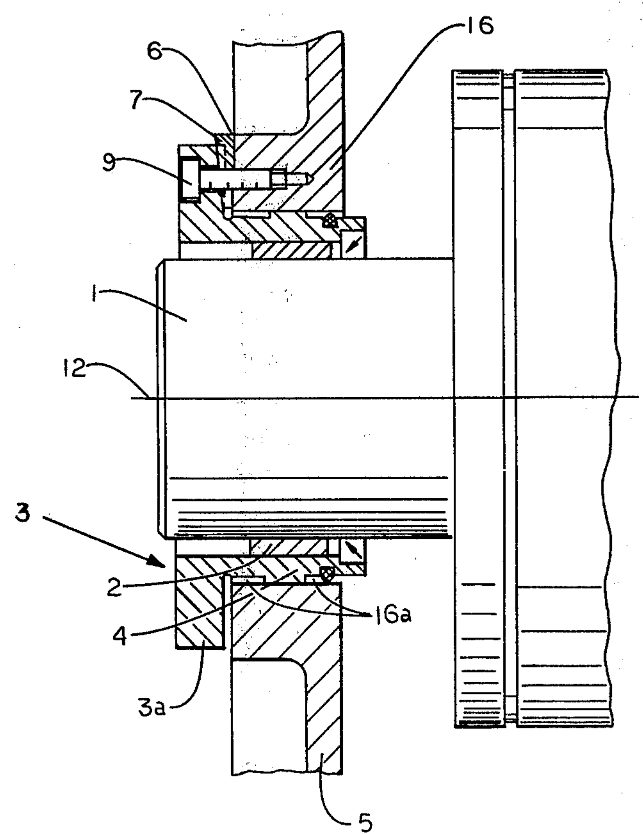
FIG. 1 is an axial section of a journal bearing according to the invention.

In FIG. 1, a journal bearing is shown which supports a shaft or trunnion 1 of e.g. a printing cylinder (shown in part) and is connected to a frame 5. The trunnion 1 is partly surrounded and supported in a sliding bushing 2 which in turn is embraced by an L-shaped flanged bearing sleeve 3. The flanged bearing sleeve 3 has one portion coaxially arranged to axis 12 of the trunnion 1 from which portion, a centering member 4 projects radially outwardly and abuts the frame 5 at the inner circumferential surface 16 of a bore formed in the frame. The centering member 4 is designed to have an axial length smaller than the axial depth of the frame bore, so that two annular clearances **16*a* are formed at opposite axial sides of the centering member 4. Integrally connected (i.e. unitary) with the one portion of the flanged bearing sleeve 3 is another (flange) portion 3*a* which is projecting outwardly and perpendicularly relative to the trunnion 1 and is provided with a plurality of grooves 8, as can be seen from FIG. 2. The grooves 8 are spaced around the periphery of the flanged bearing sleeve 3 in such a manner that they are circumferentially (angularly) offset relative to each other at angles of 120°. Each groove 8 is in engagement with a wedge 7 which is slidably supported therein and abuts the side 6 of the frame 5 which faces the portion 4 of the flanged bearing sleeve 3. As can be seen from FIG. 1, the frame 5, the wedge 7 and the flanged bearing sleeve 3 are connected by means of screws 9** in a form-locking manner.

Figure 2:
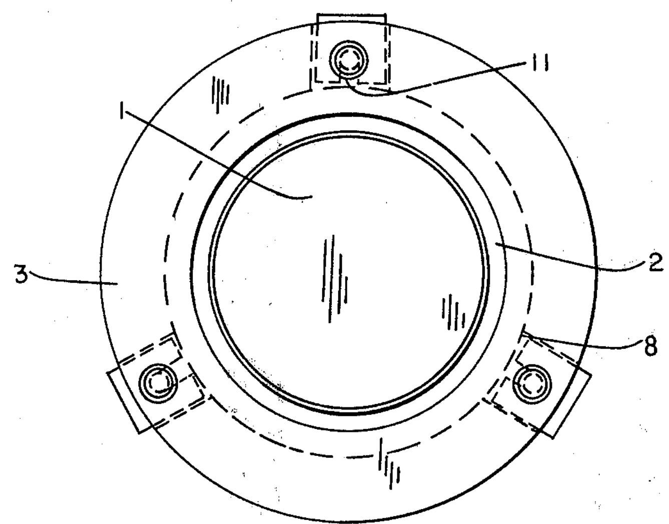
FIG. 2 is an end view of the journal bearing of FIG. 1.

Turning now to FIG. 2, it is illustrated there that the wedges 7 are each provided with an oblong hole 11 through which the respective screw extends, whereby on loosening the respective screw a mobility of each wedge 7 perpendicular to the axis 12 is achieved. A misalignment of the frame bore can now be compensated by moving one or several wedges 7 within the respective grooves 8 whereby the flanged bearing sleeve 3 correspondingly adapts its position. It is, however, to be noted that the axial length of the centering member 4 is so dimensioned that no inclination results from this adjustment, with reference to the inner surface 16 of the frame bore. In the case of small misalignments, the necessary compensation may be executed without any movement of the wedges 7, merely by elastic deformation of the flanged bearing sleeve 3.

It will be understood that each of the elements described above, or two or more together, may also find a useful application in other types of journal bearings differing from the type described above.

While the invention has been illustrated and described as embodied in a journal bearing, it is not intended to be limited to the details shown, since various modifications and structureal changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of general or specific aspects of this invention.

What is claimed as new and desired to be protected by Letters Patent is set forth in the appended claims:

1. A journal bearing of a printing machine for supporting a shaft having a central axis in a bore of a frame, comprising a flanged bearing sleeve having a portion coaxially arranged to the shaft; and adjusting means for moving the flanged bearing sleeve relative to the frame so as to compensate for misalignments of the bore, said bore having a predetermined depth, said flanged bearing sleeve being formed with a projecting centering member integral with said portion of the sleeve and abutting said frame at the inner side thereof, said centering member having a width which is smaller than the predetermined depth of said bore so that two annular clearances are formed which are defined by the frame, the flanged bearing sleeve and the centering member.

2. A journal bearing as defined in claim 1, wherein the flanged bearing sleeve is of L-shaped axial section and of deformable material.

3. A journal bearing as defined in claim 1, wherein the flanged bearing sleeve embraces a sliding bushing which supports the shaft.

4. A journal bearing as defined in claim 3, wherein the flanged bearing sleeve is provided with a plurality of grooves uniformly spaced around its periphery, said adjusting means including a plurality of wedges located in said grooves, the grooves being in engagement with respective wedges which are movable therein relative to the shaft and the bore.

5. A journal bearing as defined in claim 4, wherein the flanged bearing sleeve is provided with three grooves which are angularly offset relative to each other at angles of 120°.

6. A journal bearing as defined in claim 4, wherein each of said wedges is provided with an oblong hole, the wedges being movable normal to said axis along the respective oblong holes.

7. A journal bearing as defined in claim 6, wherein the flanged bearing sleeve is connected with the wedges and the frame in form-locking manner by means of a plurality of screws.

8. A journal bearing as defined in claim 1, wherein the frame bore has a predetermined depth, the centering member having a width which is smaller than the predetermined depth of the bore of the frame so as to obtain two annular clearances each defined by the frame, the flanged bearing sleeve and the centering member.

* * * * *